United States Patent

Bryant

[15] 3,696,530
[45] Oct. 10, 1972

[54] EDUCATIONAL TOY
[72] Inventor: Clifford F. Bryant, Struthers, Ohio
[73] Assignee: Albert White, Cadiz, Ohio ; a part interest
[22] Filed: April 14, 1971
[21] Appl. No.: 133,904

[52] U.S. Cl. ..................................... 35/28, 35/22 R
[51] Int. Cl. ............................................. G09b 1/14
[58] Field of Search ............... 35/22 R, 28; 46/37, 36; 273/155

[56] References Cited

UNITED STATES PATENTS

| | | | |
|---|---|---|---|
| 2,167,518 | 7/1939 | Lins | 35/28 UX |
| 2,948,535 | 8/1960 | Ellman | 35/28 X |
| 3,274,706 | 9/1966 | Friend | 35/28 X |

*Primary Examiner*—Harland S. Skogquist
*Attorney*—Clarence A. O'Brien and Harvey B. Jacobson

[57] ABSTRACT

A toy and educational device as well as a testing apparatus including a multi-sided base having a central platform area upon which a selected figure representation to be duplicated may be placed and with sets of individual fragmentary figure components supported from the inner ends of wands shiftably supported from the base and having their inner ends adjacent the central platform and their outer ends projecting outwardly of the sides of the base for manual manipulation by persons using the toy or testing device.

9 Claims, 10 Drawing Figures

PATENTED OCT 10 1972

Clifford F. Bryant
INVENTOR.

BY Clarence A. O'Brien
and Harvey B. Jacobson
Attorneys

Clifford F. Bryant
INVENTOR.

BY Clarence A. O'Brien
and Harvey B. Jacobson
Attorneys

PATENTED OCT 10 1972 3,696,530

Clifford F. Bryant
INVENTOR.

BY Clarence A. O'Brien
and Harvey B. Jacobson
Attorneys

EDUCATIONAL TOY

The educational toy of the instant invention has not only been designed to provide an educational toy for small children but also as an apparatus which may be utilized in testing and developing motor and mental skills.

The toy is constructed in a manner whereby specific motor skills must be utilized in operation of the toy or testing device and the requisite mental skills for proper use of the toy or testing device may be varied according to the selected figure representations to be duplicate and the corresponding fragmentary figure components to be assembled together in duplicating the selected figure representation.

The main object of this invention is to provide an apparatus which may be utilized as a toy in developing motor and mental skills of small children.

Another object of this invention is to provide a testing device which may be utilized to test the motor and mental skills of various ages of children at various achievement levels.

Still another object of this invention is to provide an educational toy whose operation may be readily understood by small children.

Another important object of this invention, in accordance with the immediately preceding object, is to provide a motor and mental skill testing apparatus which may be readily explained to various persons to be tested.

A final object of this invention to be specifically enumerated herein is to provide an apparatus in accordance with the preceding objects which will conform to conventional forms of manufacture, be of simple construction and easy to use so as to provide a device that will be economically feasible, long lasting and readily usable both by small children and persons having their motor and mental skills tested.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
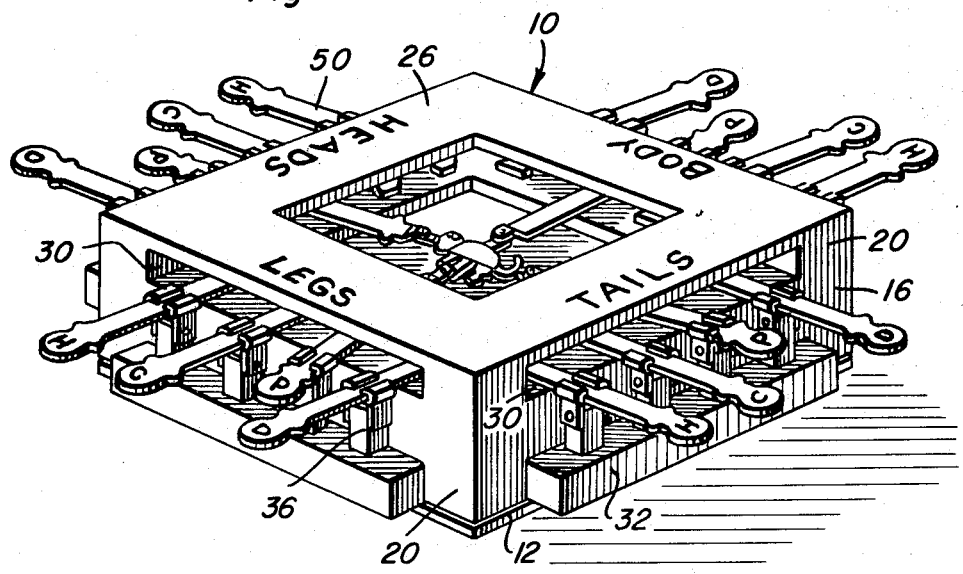
FIG. 1 is a perspective view of the apparatus of the instant invention.

Referring now more specifically to the drawings, the numeral 10 generally designates the educational and testing apparatus of the instant invention. The apparatus 10 includes a base panel 12 including a central upstanding cylindrical pin 14. The apparatus 10 further includes a rectangular base 16 having a central downwardly opening blind bore 18 formed therein in which the upwardly projecting pin is seated with the undersurface of the base 16 spaced slightly above the upper surface of the base panel 12. In this manner, the base 16 is rotatably supported from the base panel 12 for rotation relative thereto about an upstanding axis.

Figure 10:
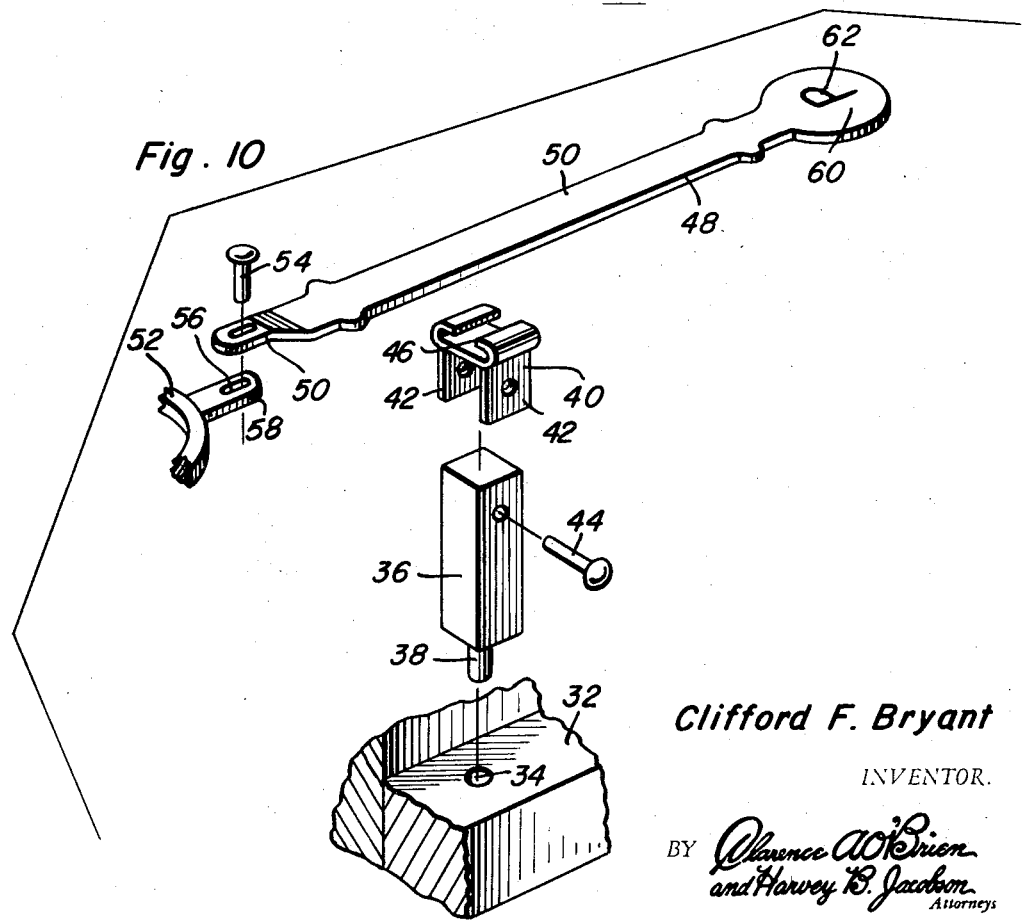
FIG. 10 is an exploded perspective view illustrating one of the support wands and the manner in which the support wand is shiftably supported from the base of the apparatus.

From FIG. 1 of the drawings, it may be noted that the base 16 is generally square in plan shape and includes four sides 20 as well as a central upwardly opening recess 22. In addition, the four corner portions of the base 16 include vertically short pillars 24 which project upwardly therefrom and support a generally square top wall 26 above the base 16, the top wall 26 having a square central opening 28 formed therein is registry with the recess 22. If it is desired, the base, pillars 24 and top wall 26 may be of one-piece construction. In any event, the four sides 20 of the base 16 have laterally outwardly and inwardly opening windows 30 formed therein which open outwardly of the sides 20 and inwardly into the area between the top wall 26 and the upper surface of the base 16. Each of the sides 20 also has a lower support block 32 mounted thereon and projecting outwardly therefrom and each of the support blocks 32 includes four upwardly opening blind bores 34. Four support standards 36 are provided and supported from each support block 32. Each standard 36 includes a diametrically reduced depending central pin 38 journalled and seated in the corresponding bore 34 and a slide bracket 40 including depending apertured mounting ears 42 is oscillatably supported from the upper end of each support standard 36 by means of a pivot pin 44. Each support bracket 40 defines a T-shaped guide channel 46 in which the shank portion 48 of a corresponding support wand 50 is slidingly received. The inner end of each support wand 50 includes a slightly upwardly depressed slotted extension 50 to which a predetermined figure component such as the tail component 52 illustrated in FIG. 10 of the drawings is pivotally secured by means of a pivot fastener 54 secured through the slotted extension 50 and the slot 56 in the supporting tongue 58 of the tail component 52. The outer end of the support wand 50 has an enlarged handle portion 60 supported therefrom with an indicating letter or numeral 62 marked thereon.

A support block 66 is secured within the recess 22 and includes an upper surface 68 having four corner located blind bores 70 formed therein. The bores 70 are vertically disposed and open upwardly through the upper surface 68.

Figure 5:
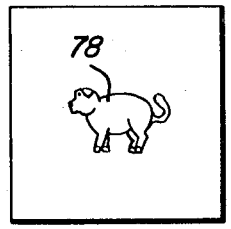
FIGS. 5-8 are top plan views of a selected group of four figure representations to be duplicated.
Figure 6:
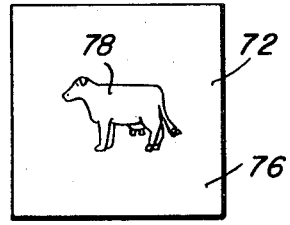
Figure 7:
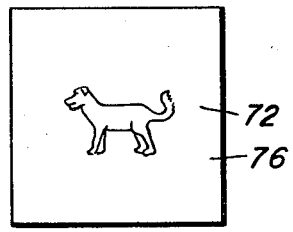
Figure 8:
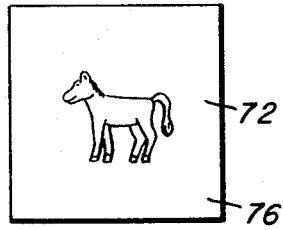
Figure 9:
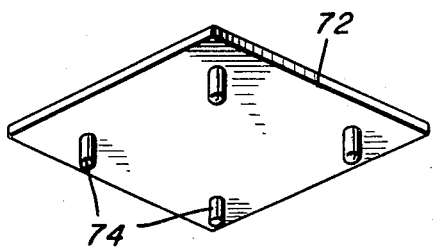
FIG. 9 is a bottom plan view of one of the figure representation panels illustrating the depending pins thereof by which it may be stationarily keyed to the central base of the apparatus.

A plurality of panels 72 are provided and each panel 72 includes four corner located depending pins 74 which are downwardly seatable in the blind bores 70 when the panel 72 is positioned over the support block 66 in the manner illustrated in Figure of the drawings. It will be noted that when a panel 72 is supported from the support block 66, the upper surface of the panel 72 is substantially coplanar with the lower surfaces of the openings or windows 30. Further, it will be noted that the upper surface 76 of each panel 72 includes a different figure representation 78. The figure representation illustrated in FIG. 5 comprises a pig, a cow in FIG. 6, a dog in FIG. 7 and a horse in FIG. 8.

Figure 2:
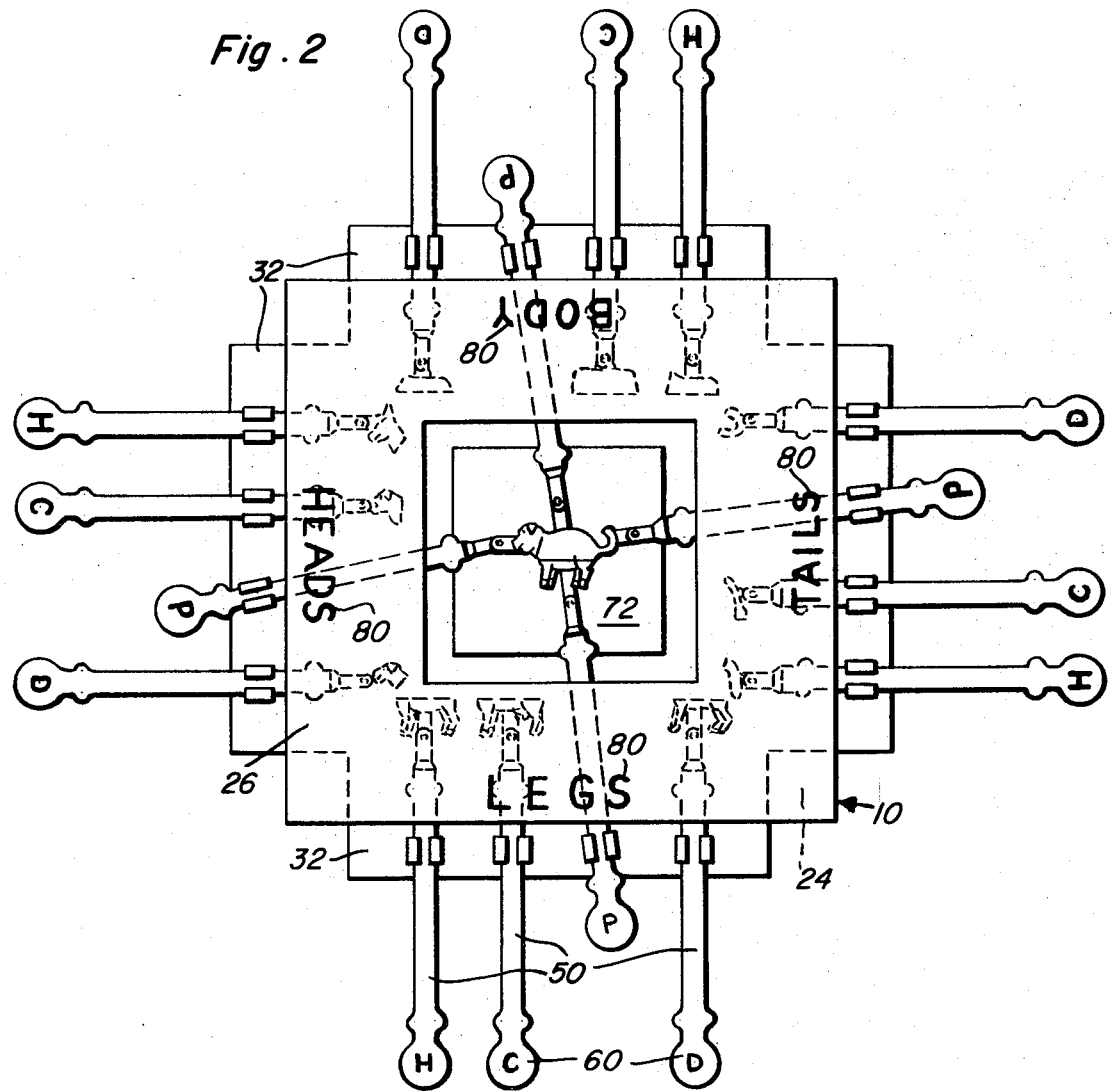
FIG. 2 is an enlarged top plan view of the apparatus.
Figure 4:
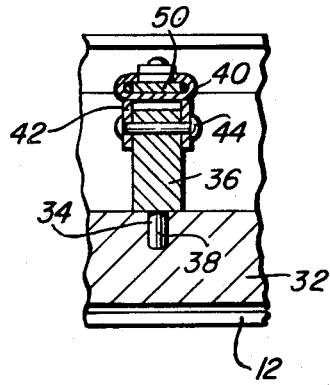
FIG. 4 is a fragmentary vertical sectional view illustrating the manner in which the support wands are shiftably supported from the base.

It will be noted that the marginal edge portions of the upper surface of the top wall 26 include indicia 80 designating the names of the figure components supported from the corresponding support wands 50. The wands at the right side of FIG. 2 support the tails of the various animals, the wands at the upper portion of FIG. 2 support the body portions of the various animals, the wands at the left hand edge of FIG. 2 support the head of the various animals and the wands at the lower portion of FIG. 2 support the legs of the various animals.

Figure 3:
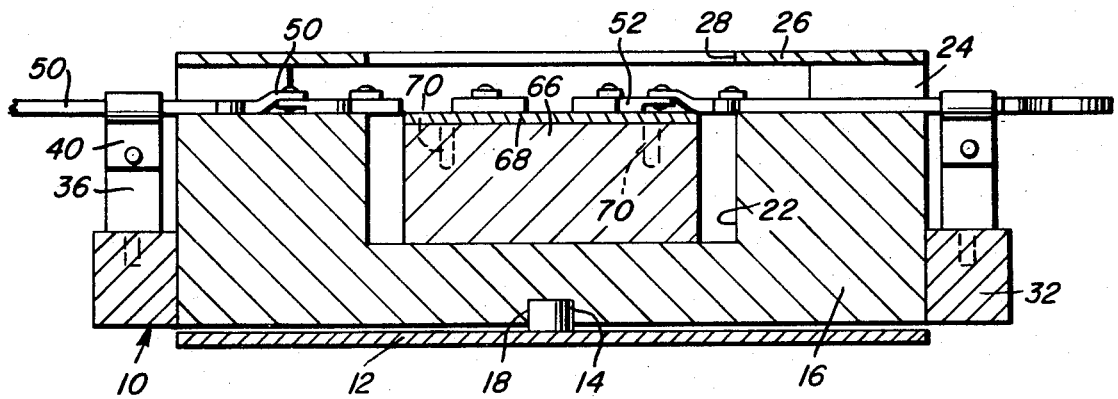
FIG. 3 is a further enlarged vertical sectional view taken substantially upon a plane passing through the center of the apparatus.

In operation, a selected panel 72 may be placed upon the support block 66 in the manner illustrated in FIG. 3 of the drawings. Then, with a person seated at one side of the apparatus 10, he may attempt to place the correct tail over the tail portion of the figure representation 78 on the selected panel 72. Thereafter, the base 16 may be rotated so as to position an adjacent side of the body 16 in front of the person using the apparatus. If the body component side of the base 16 is next positioned in front of the person using the apparatus, that person must then attempt to shift the body component supported therefrom into registry with the body area of the figure representation selected and supported from the support block 66. Thereafter, the head and leg components may be successively placed into position.

The indicating letter 62 on the outer end of each wand 56 may be of assistance to the person using the apparatus 10 in that the wands 50 supporting the horse components are marked with the letter "H," the wands supporting the cow components are marked with the letter "C," the wands 50 supporting the pig components are marked with the letter "P" and the wands 50 supporting the dog components are marked with the letter "D."

Of course, the animal representations illustrated and described herein may be readily replaced by other figures selected in accordance to the degree of education or testing desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A motor and mental skill developing and testing apparatus comprising a base including a central area and surrounding marginal portions, a horizontal member removably positionable on said central area for support therefrom, the upper surface of said horizontal member including a design figure thereon to be duplicated by the assembling of predetermined designed components thereover which when assembled will duplicate said design figure, a plurality of elongated support wands supported from said marginal portions and extending inwardly toward said central area, the inner ends of said wands having said predetermined design components supported therefrom, said wand being supported from said marginal portions for longitudinal shifting relative thereto.

2. The combination of claim 1 including a support for each of said wands supported from the corresponding marginal portion of said base, each of said supports being mounted from said base for oscillation about an upstanding axis and including guide means supported therefrom relative to which said wands are longitudinally shiftable and comprising the means by which said wands are supported from said marginal portions for longitudinal shifting relative thereto.

3. The combination of claim 2 wherein each marginal portion includes a plurality of wands supported therefrom for longitudinal shifting and oscillation about upstanding axes, the inner ends of the wands supported from each marginal portion of said base including design components of different designs to be duplicated, said apparatus including a plurality of horizontal members removably positionable on said central area with each of said member including a different design to be duplicated on its upper surface.

4. The combination of claim 3 wherein the outer ends of the wands supporting the design components of the different designs to be duplicated include identifying indicia relating to the corresponding design to be duplicated.

5. The combination of claim 1 including a support member adapted to be disposed upon a support surface and upon which said base is mounted for adjustable angular displacement about an upstanding axis passing centrally through said central area.

6. The combination of claim 5 wherein said base includes four relatively angulated marginal portions.

7. The combination of claim 6 wherein said design to be duplicated comprises the figure of an animal, the design components supported by said wands including the legs, the tail, the body and the head of the animal figure to be duplicated.

8. The combination of claim 7 including a support for each of said wands supported from the corresponding marginal portion of said base, each of said supports being mounted from said base for oscillation about an upstanding axis and including guide means supported therefrom relative to which said wands are longitudinally shiftable and comprising the means by which said wands are supported from said marginal portions for longitudinal shifting relative thereto, each marginal portion including a plurality of wands supported therefrom for longitudinal shifting and oscillation about upstanding axes, the inner ends of the wands supported from each marginal portion of said base including design components of different designs to be duplicated, said apparatus including a plurality of horizontal members removably positionable on said central area with each of said members including a different design to be duplicated on its upper surface.

9. The combination of claim 1 wherein each marginal portion includes a plurality of wands supported therefrom for longitudinal shifting and oscillation about upstanding axes, the inner ends of the wands supported from each marginal portion of said base including design components of different designs to be duplicated, said apparatus including a plurality of horizontal members removably positionable on said central area with each of said members including a different design to be duplicated on its upper surface.

* * * * *